United States Patent
Lin et al.

(10) Patent No.: US 9,841,790 B2
(45) Date of Patent: Dec. 12, 2017

(54) LEVER RELEASE MECHANISM FOR A COMPUTER COMPONENT

(71) Applicant: Dell Products L.P., Round Rock, TX (US)

(72) Inventors: Kuang Hsi Lin, Taoyuan (TW); Wei-Ti Kuo, Taipei (TW); Ling Chen Chang, Taipei (TW); Hsiang-Yin Hung, Hualien (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/093,605

(22) Filed: Apr. 7, 2016

(65) Prior Publication Data

US 2017/0293326 A1     Oct. 12, 2017

(51) Int. Cl.
*G06F 1/18*     (2006.01)
*G06F 1/16*     (2006.01)

(52) U.S. Cl.
CPC ............ *G06F 1/181* (2013.01); *G06F 1/1633* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,379,184 A * | 1/1995 | Barraza | ................. | G06F 3/0601 16/438 |
| 6,252,514 B1 * | 6/2001 | Nolan | ..................... | G06F 1/183 340/686.4 |
| 6,325,353 B1 * | 12/2001 | Jiang | ....................... | G06F 1/184 248/682 |
| 6,774,808 B1 * | 8/2004 | Hibbs | .................... | G06F 1/184 340/686.4 |
| 6,854,174 B2 * | 2/2005 | Jiang | ....................... | G06F 1/184 248/682 |
| 8,743,536 B2 * | 6/2014 | Alo | ......................... | G06F 1/187 361/679.33 |
| 2002/0080574 A1 * | 6/2002 | Jiang | ....................... | G06F 1/184 361/679.33 |
| 2011/0080705 A1 * | 4/2011 | Figuerado | ............... | G06F 1/187 361/679.33 |
| 2011/0096490 A1 * | 4/2011 | Sanchez | ................. | G06F 1/187 361/679.33 |

* cited by examiner

*Primary Examiner* — Lisa Lea Edmonds
(74) *Attorney, Agent, or Firm* — Norton Rose Fulbright US LLP (57) ABSTRACT

A latch and release mechanism for a computer component may allow release of the component with reduced force and easier access through a cam lever that rotates around a pivot point, such as a pin, to translate rotational motion into a force to unlock the drive from a bay of a chassis. Additionally, the cam lever may be configured to provide a force that ejects the drive from the bay nearly simultaneously with the unlocking of the drive. Thus, a user can remove a drive from a bay with a small application of a single type of force to the cam lever of a latch and release mechanism.

9 Claims, 9 Drawing Sheets

LEVER RELEASE MECHANISM FOR A COMPUTER COMPONENT

FIELD OF THE DISCLOSURE

The instant disclosure relates to computer systems. More specifically, portions of this disclosure relate to carriers for installation of components in computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Server computer systems, such as those in information handling systems, often require large amounts of disk storage and/or highly redundant disk storage for data. That data may include information such as web pages and database content for a shopping website or a news website, bank account information, or movie and television show videos, among many other kinds of data. Large amounts of data require a large number of hard disk drives (HDD) to store the data. Further, high redundancy can require multiple copies of the same data to be stored on different hard disk drives (HDDs) in case of a failure of one of the hard disk drives (HDDs). Thus, there are often many hard disk drives (HDDs) in server computer systems. The number of hard disk drives (HDDs) for a data center installation are often several times the number of servers installed in the data center. In data centers with tens or hundreds of servers, the number of hard disk drives (HDDs) can be over a hundred or several hundred. Hard disk drives (HDDs) are conventionally mounted in carriers that can be inserted or removed from chassis in a data center.

Figure 1:
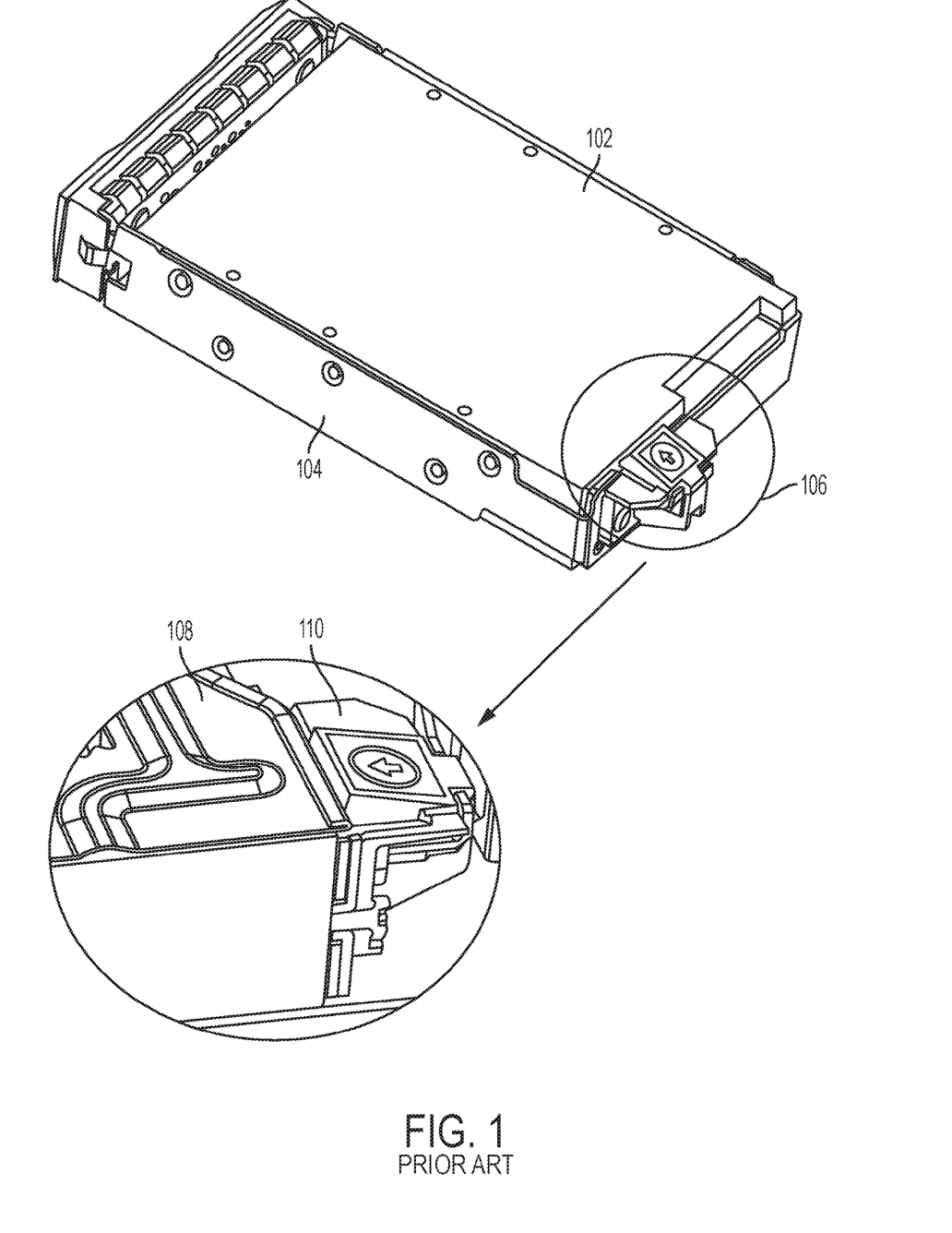
FIG. 1 is a hard disk drive (HDD) carrier assembly according to the prior art.

FIG. 1 is an example hard disk drive (HDD) carrier assembly according to the prior art. A hard disk drive (HDD) 102 may be attached to a carrier 104 having a locking and release mechanism 106. The locking and release mechanism 106 is shown in further detail in an inset view of FIG. 1. The mechanism 106 includes a latch 110 that clips onto the top cover 108 when the carrier 104 is fully inserted into a chassis. Releasing the HDD 102 involves applying a combination of forces. First, a downward force on the latch 110 is applied to release the carrier 104 from the top cover 108. Second, a nearly simultaneous outward force is applied to push the HDD 102 forward in a bay such that the HDD 102 extends out of the bay enough for a user to grab a front of the HDD 102 and fully remove the HDD 102 from the bay. The force and coordination required of a user to accomplish the removal of the HDD 102 can frustrate a user. Further, over application of force can cause damage to components, either the HDD 102, the latch 110, or the top cover 108. For example, the top cover 108 may be scratched by application of the outward force to the latch 110 when the latch 110 extends over the top cover 108.

With such a large number of hard disk drives (HDDs), maintenance tasks, such as replacing a failed drive, can be frequent. Thus, easy and quick access to insert and release HDDs is important, both in reducing failures and reducing maintenance time.

SUMMARY

Certain embodiments of this disclosure include a latch and release mechanism for a computer component, such as a hard disk drive (HDD), other storage device, or power supply. The mechanism may allow release of the component with reduced force and easier operation. The mechanism may receive force from a user through a cam lever that rotates around a pivot point, such as a pin, to translate rotational motion into a force to unlock the drive from a bay of a chassis. Additionally, the cam lever may be configured to provide a force that ejects the drive from the bay nearly simultaneously with the unlocking of the drive. Thus, a user can remove a component from a bay with a small application of a single type of force to the cam lever of a latch and release mechanism. In some embodiments, the cam lever may be manufacturing from plastic.

According to one embodiment, an apparatus may include a bay configured to receive a computer component, such as a hard disk drive (HDD), wherein the bay comprises a stopper flange configured to receive a carrier latch of a hard disk drive (HDD) carrier assembly to lock the hard disk drive (HDD) into the bay. The apparatus may also include a computer component release mechanism attached to or in the proximity of the bay. The release mechanism may include a housing, a pivot point, such as a pin, and a cam. The cam may include a handle at one distal end and a tip at an opposite distal end. The cam may be attached to rotate around the pivot point. The tip of the cam may abut against, although not necessarily make contact with, the stopper flange in the bay. The cam may be configured to rotate around the pivot point such that application of force down on the handle results in an upward force against the carrier latch to unlock the hard disk drive (HDD) from the bay. A bias mechanism, such as a spring, may be coupled to the cam and configured to return the cam to a starting position after an application of force down on the handle.

In certain embodiments, the bay may also include an opening to receive a computer component support bracket. The cam may thus include an edge for translating rotational motion into lateral motion such that additional rotation of the cam around the pivot point causes a lateral force to be applied to the support bracket to eject the computer component from the bay.

The bay may be one of many bays within a bracket configured to attach as part of a chassis to receive a plurality of computer components. A computer component release mechanism may be attached in close proximity to each bay in the chassis. Further, each bay may include a fixed cable assembly configured to couple to at least one of data and power ports of a computer component when the computer component is locked into the bay.

Additionally, or alternatively, an apparatus may include a computer component carrier. The carrier may be configured to accept a computer component and slide into a bay of a chassis to install a computer component in a computer system, such as a rack mounted server. The carrier may include a cage configured to attach to a computer component and partially surround or completely surround the computer component. The carrier may also include a carrier latch attached to the cage and comprising an extrusion or other feature near a distal end and a surface, such as an angled portion, at the distal end. The extrusion may be used to lock the computer component in the bay by coupling to the carrier latch of the bay. The angled portion may be used to receive force applied from the cam lever to unlock the computer component.

In certain embodiments, the carrier may also include a support bracket attached to the cage and having a flat surface distant from and attached to the carrier. The support bracket may be configured to receive an applied force from a lever mechanism to eject the carrier from the bay.

One method for releasing a computer component mounted in a carrier from a bay may include applying a first force to a lever, wherein a tip of the lever actuates a carrier latch of the carrier to release the latch from a locked position, and applying a subsequent force to the lever, wherein an edge of the lever applies a proportional amount of force to a support bracket of the carrier to eject the carrier from the bay. The first force and subsequent force may be provided by a user in one smooth motion, such that the user is physically only applying one force but the lever is carrying out one action with a first portion of the force and a second action with a second portion of the force. The applied first force may rotate the lever around a pin to translate a downward force on the lever to an upward force on the carrier latch to elevate the carrier latch above a stopper flange. The applied second or subsequent force may rotate the lever around a pivot point to translate a downward force on the lever to a lateral force applied to the support bracket to push the carrier out of the bay. The lateral force applied to the support bracket may also disconnect at least one of a data and a power connector from the component.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A combination of components operating together within a chassis can provide a user with easier insertion and removal of a computer component. The components may allow a single user motion to perform multiple functions related to the installation or removal of the computer components. For example, a lever may translate a user's applied force to perform one or more functions relating to unlocking the computer component, ejecting the computer component, and/or disconnecting cables or other fasteners from the computer component. In one example, a lever may unlock, eject, and disconnect cables from a computer component installed in a bay. In particular, a single cam lever may provide one or more functions that can be operated using familiar and simple user motions. For example, the cam lever may provide a large easy-to-operate surface for a user to access and require only a simple motion to release a computer component from the bay. Additionally, using the same lever and the same simple motion the user may eject the computer component from the bay when releasing the computer component.

Figure 2A:
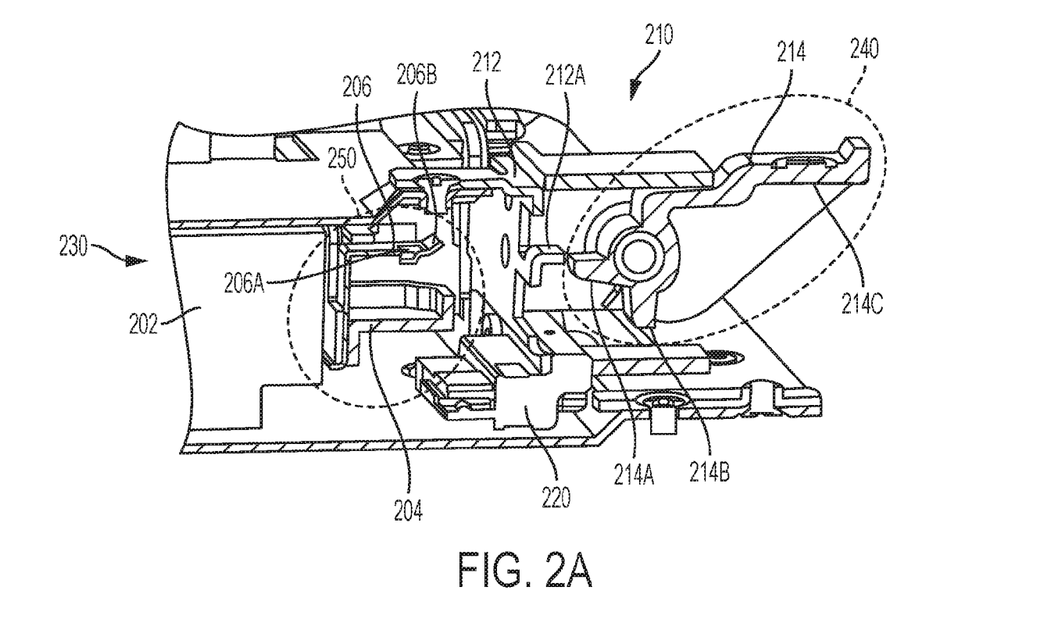
FIG. 2A is an example carrier assembly for locking a computer component in a bay and associated components for releasing the computer component from the bay shown prior to locking of the computer component in the bay according to one embodiment of the disclosure.
Figure 2B:
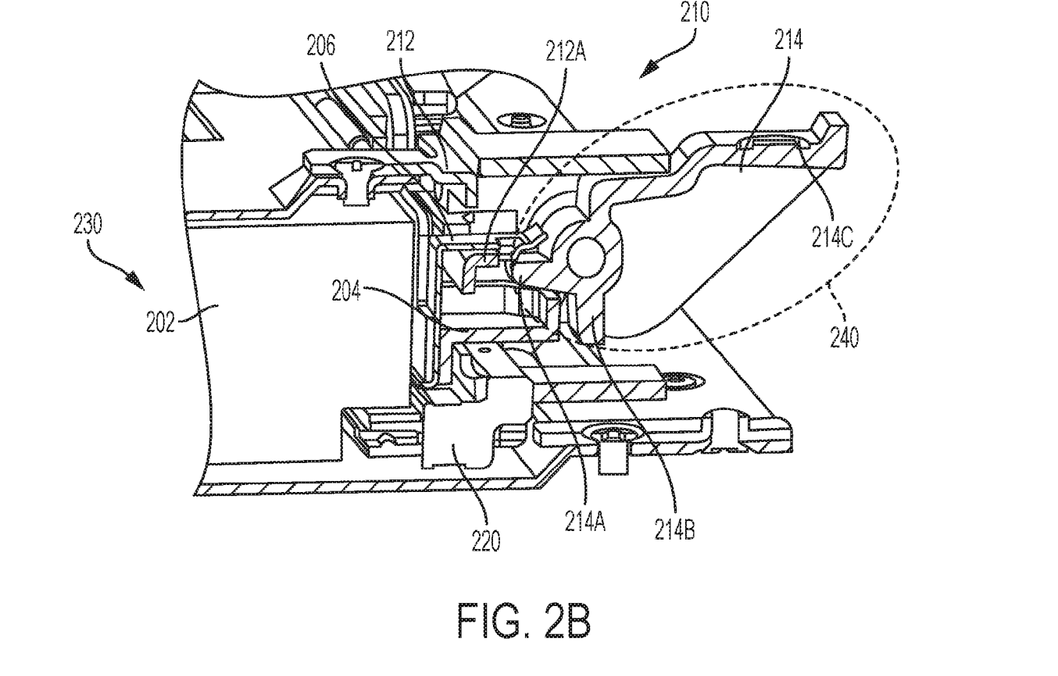
FIG. 2B is an example computer component carrier assembly for locking a computer component in a bay and associated components for releasing the computer component from the bay shown after locking of the computer component in the bay according to one embodiment of the disclosure.

The operation of inserting and locking a computer component, such as a hard disk drive (HDD), into a bay having a release mechanism according to one embodiment of the disclosure is shown in FIG. 2A and FIG. 2B. Although certain examples described herein may refer specifically to the release of a hard disk drive (HDD), the components, operation, and functionality described herein may apply to any computer component stored. FIG. 2A illustrates the insertion of a carrier assembly 202 into a bay 230 prior to locking of the carrier assembly 202 in the bay 230. FIG. 2B illustrates the carrier assembly 202 coupled to a bracket 212 in the bay 230. Referring first to FIG. 2A, an apparatus for receiving, locking, and releasing a computer component in a chassis generally includes two components. One component is the carrier assembly 202 that attaches to and carries a computer component. These components are generally manufactured by OEMs separate from the manufacture and assembly of a computer system. The carrier assembly 202 thus allows for computer components from different manufacturers to be brought into conformity for a particular chassis. Another component is a bracket for receiving the carrier assembly 202 that includes components for the locking and releasing of the carrier assembly 202. In some embodiments, the bracket may fit in a chassis to divide space into a plurality of bays and provides components for the locking and releasing of the carrier assembly 202 in and out of each of the bays.

The carrier assembly 202 may house a computer component for storing data for reading and writing from a computer system. Attached to the carrier assembly 202 is a carrier latch 206. The carrier latch 206 may be used to lock the carrier assembly 202 to a bracket 212 of the bay 230. The carrier latch 206 may include features that assist with the locking and release of the carrier assembly 202. For example, the carrier latch 206 may include a member 206A near a distal end of the carrier latch 206 away from the drive. The member 206A may be used to couple, such as to fix or engage, the carrier assembly 202 to the bracket 212. In one embodiment, the member 206A is an extrusion or protuberance that fits into an opening and provides resistance to the removal of the carrier assembly 202 after the member 206A fits into the opening. As another example, the carrier latch 206 may include a surface 206B at a distal end of the carrier latch 206 away from the drive. The surface 206B may be used to receive force that lifts the member 206A to decouple the carrier latch 206 from the bracket 212. In one embodiment, the surface 206B may be a flat surface. Additionally, in certain embodiments, the surface 206B may be angled.

The bracket 212 may include a stopper flange 212A. The stopper flange 212A may be configured to couple with the carrier latch 206A. For example, sizing of the stopper flange 212A may allow the carrier latch 206 to extend over the stopper flange 212A and the member 206A to lock in place over the stopper flange 212A. The stopper flange 212A then provides resistance to any attempted removal of the carrier assembly 202 from the bay 230. Also attached to the bracket 112 is a release mechanism 240 to actuate the carrier latch 206 and decouple the carrier assembly 202 from the bracket 212. The release mechanism 240 may include a cam lever 214 with a surface 214C for user operation. The cam lever 214 may include features that translate a user's applied force to surface 214C into appropriate motions for controlling the carrier assembly 202. For example, the cam lever 214 may include a tip 214A that abuts, but does not necessarily contact, the stopper flange 212A. The tip 214A may be configured to apply force to the surface 206B of the carrier latch 206 to decouple the carrier assembly 202 from the bracket 212. As another example, the cam lever 214 may include an edge 214B located a short distance from the tip 214A. The edge 214B may be configured to apply force to the support bracket 204 to eject the carrier assembly 202 from the bay 230.

As described above, FIG. 2A illustrates the carrier assembly 202 partially inserted into the bay 230. A user may apply force to a front (not shown) of the carrier assembly 202 or the drive mounted in the carrier assembly 202 to continue to insert the carrier assembly 202 into the bay 230. FIG. 2B illustrates the carrier assembly 202 fully inserted and locked in bay 230. After the carrier assembly 202 is fully inserted into the bay 230, the carrier latch 206 couples to the stopper flange 212A to lock the carrier assembly 202 in the bay. When the carrier assembly 202 is locked in the bay 230, one or more cable connectors 220 may couple one or more of data and power cables to a drive (not shown) within the carrier assembly 202.

Figure 3:
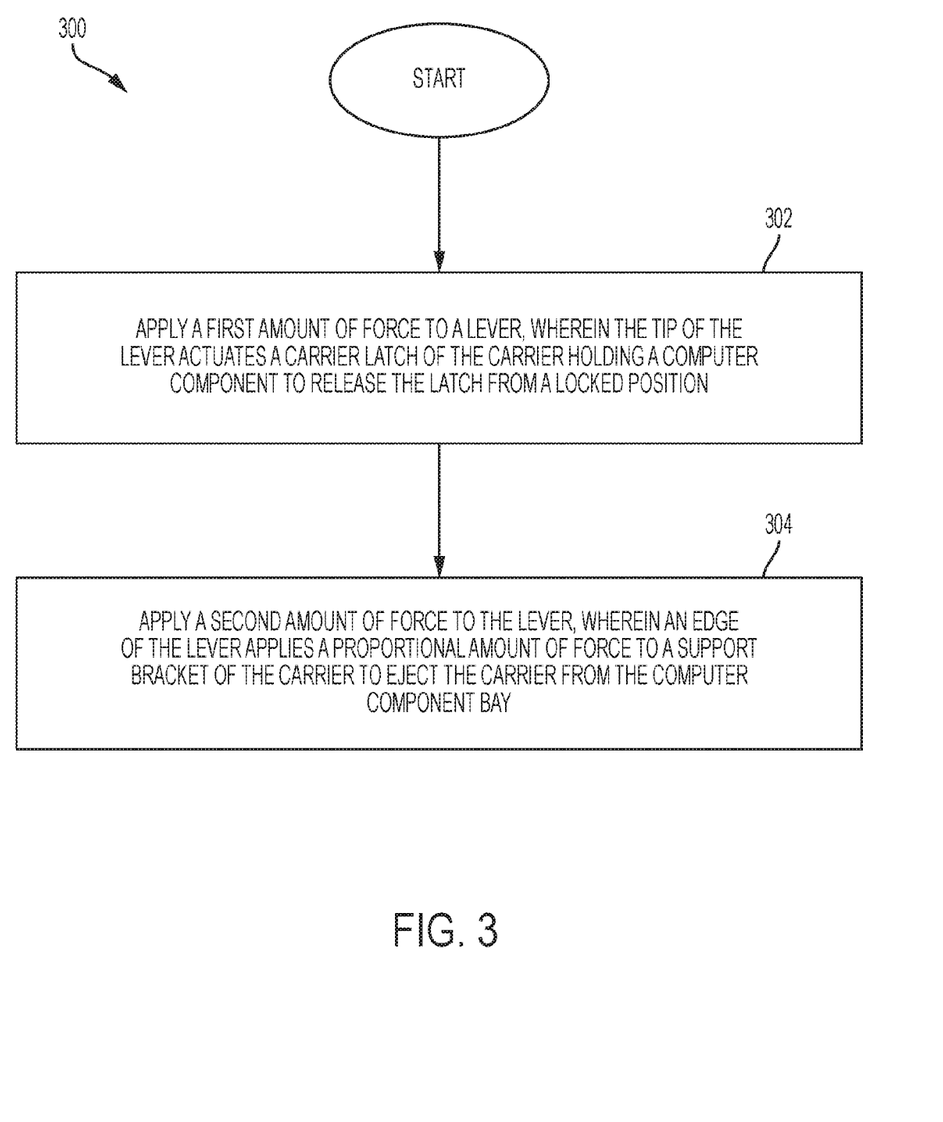
FIG. 3 is a flow chart showing an example method for releasing a computer component carrier assembly from a bay according to one embodiment of the disclosure.

Ejection of the carrier assembly 202 from the bay 230 may be easily accomplished through operation of the cam lever 214 by a user. Although user operation may include applying a force to the cam lever 214, a user need not physically apply the force. Rather, a user may set into course actions that cause the cam lever 214 to be actuated. For example, a user may cause a servo or other mechanism to actuate the cam lever 214 or the user may program operation into a computer system such that the program activates a servo to actuate the cam lever 214. FIG. 3 is a flow chart showing an example method for releasing a computer component carrier assembly from a bay according to one embodiment of the disclosure. A method 300 begins at block 302 with applying a first force to a lever, wherein a tip of the lever actuates a carrier latch of the carrier to release the latch from a locked position. Referring back to FIG. 2B, the first force may rotate the lever cam 214 around a pivot point, such as may be provided by a pin, axel, or other component, to translate a downward force on surface 214C to an upward force on the carrier latch 206 to elevate the carrier latch 206 above the stopper flange 212A. Then, at block 304, a second subsequent force is applied to the lever. The second force may cause the edge 214B to apply a proportional amount of force to a support bracket 204 of the carrier assembly 202 to eject the carrier assembly 202 from the bay 230. Although the first force and the subsequent force are described as separate steps, they may be performed by a user in a single motion. That is, a single downward force on surface 214C may cause the release and ejection of the carrier assembly 202. This simple motion is easily performed by a user with, for example, a single finger.

Figure 4A:
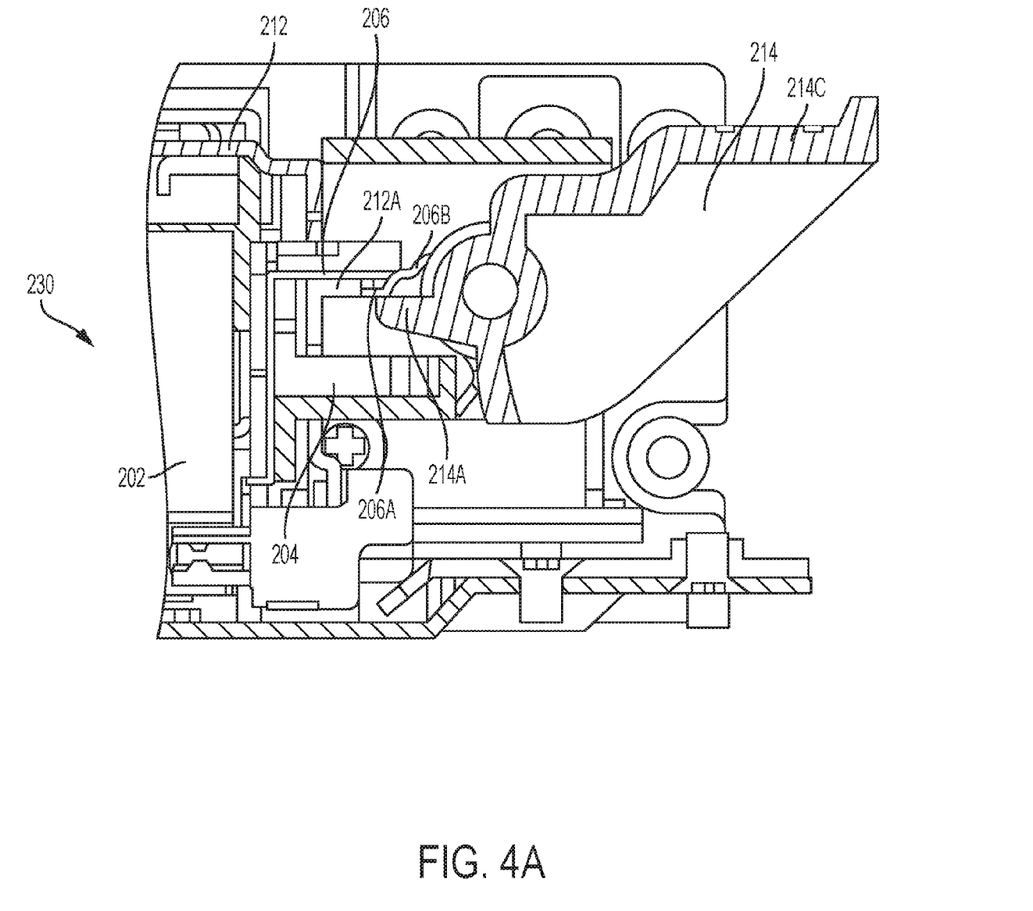
FIG. 4A is a cross-sectional view of an example carrier assembly in a bay prior to operation of a release lever according to one embodiment of the disclosure.
Figure 4B:
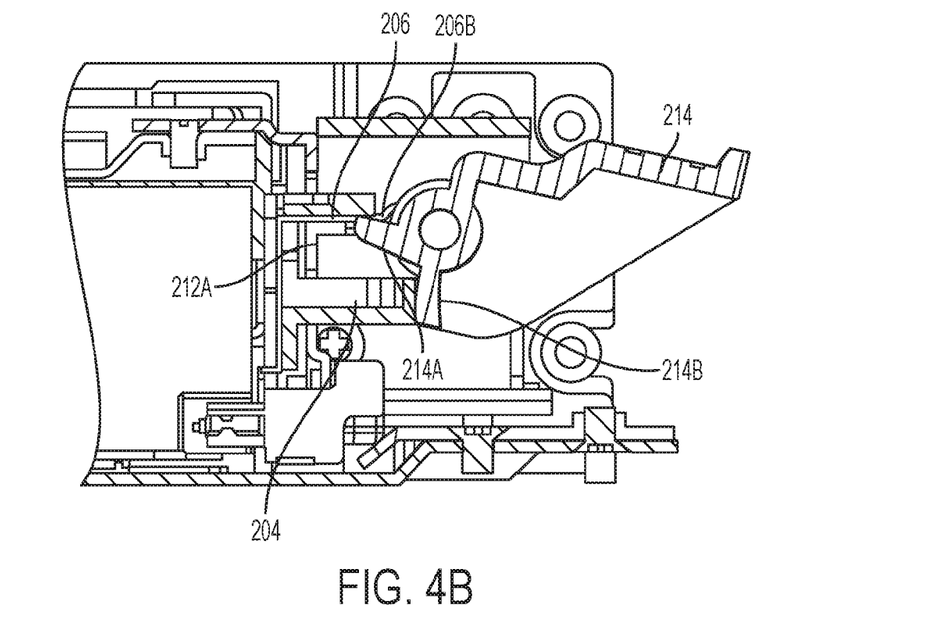
FIG. 4B is a cross-sectional view of an example carrier assembly in a bay as the carrier latch is unlocked from a stopper flange according to one embodiment of the disclosure.
Figure 4C:
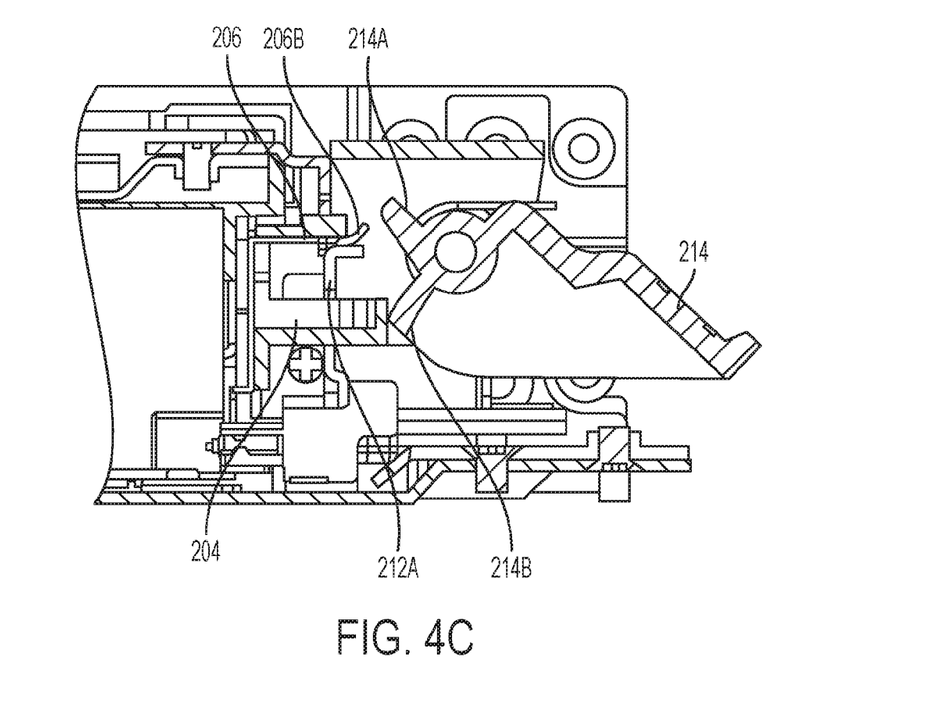
FIG. 4C is a cross-sectional view of an example carrier assembly in a bay showing ejection of the computer component according to one embodiment of the disclosure.

The actions performed by release mechanism 240 of FIG. 2A operated according to the method of FIG. 3 are described in further detail with reference to FIG. 4A, FIG. 4B, and FIG. 4C. FIG. 4A illustrates the locked state for the carrier assembly 202 in the bay 230. The carrier latch 206 is coupled to the stopper flange 212A to secure the carrier assembly 202 in the bay 230. To release the carrier assembly 202 a user may execute the steps shown in FIG. 3. As described in block 302 of FIG. 3, a user applies a downward force on surface 214C, which causes the tip 214A to press against the carrier latch 206, such as against the member 206A or the surface 206B as shown in FIG. 4B. As pressure is applied, the member 206A is lifted above the stopper flange 212A to unlock the carrier assembly 202 from the bay 230. Then, as described in block 304 of FIG. 3, a user continues to apply a downward force on surface 214C, which causes the edge 214B to make contact with the support bracket 204. Pressure applied to the support bracket 204 pushes the carrier assembly 202 out of the front of the bay 230 as shown in FIG. 4C. The carrier assembly 202 may be ejected by at least a small distance such that a user may grab the released carrier assembly 202 in the drive from the front of the chassis and pull the assembly 202 out of the chassis.

Figure 5:
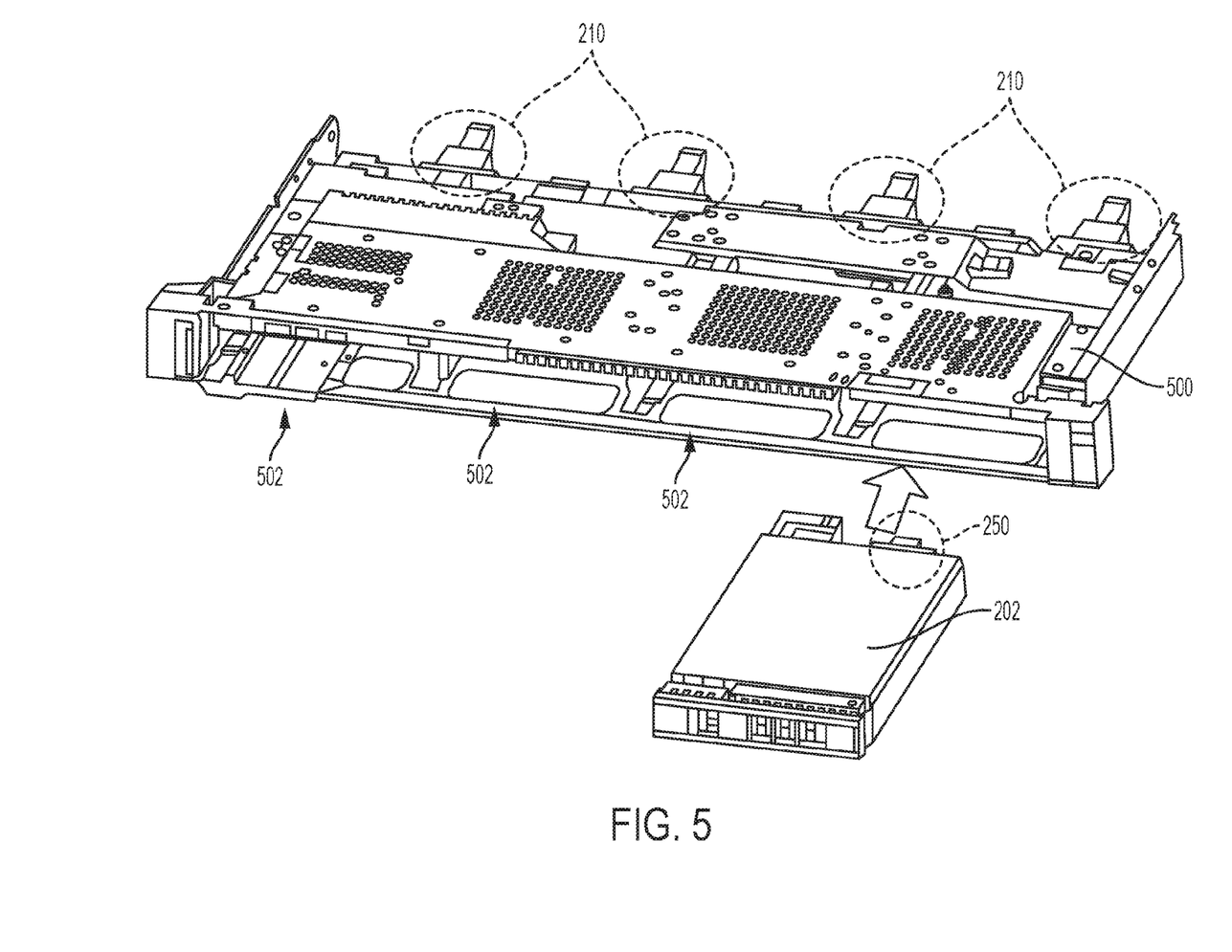
FIG. 5 is an example bracket implementing release mechanisms in several bays according to one embodiment of the disclosure.
Figure 6:
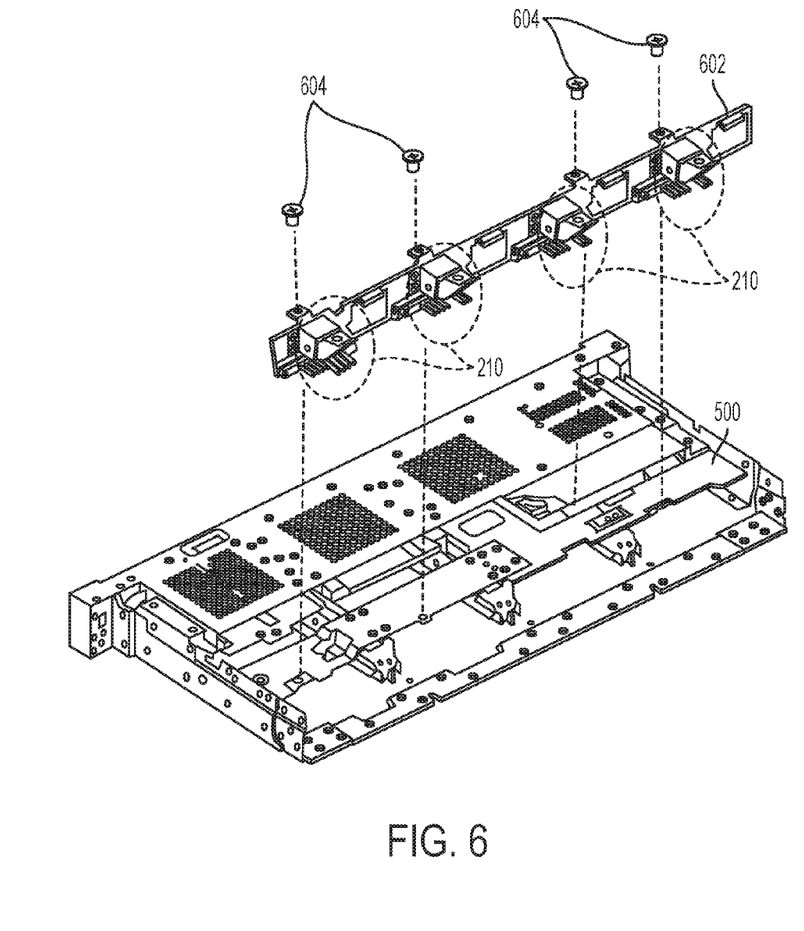
FIG. 6 is an example installation of a bracket implementing release mechanisms in several bays according to one embodiment of the disclosure.

The locking and release mechanism described above may be attached to a bracket for a chassis, as shown in FIG. 5. FIG. 5 is an example bracket implementing release mechanisms in several bays according to one embodiment of the disclosure. A bracket 500 may divide the space inside the chassis (not shown) into multiple bays 502. Each of the bays 502 may have a locking and release mechanism 210 in close proximity and/or attached to the bracket 500 to receive, lock, and release a carrier assembly 202 having a locking mechanism 250. In one embodiment, the locking and release mechanisms 210 are attached to the bracket 500 as shown in FIG. 6. FIG. 6 is an example installation of a bracket implementing release mechanisms in several bays for computer components according to one embodiment of the disclosure. Screws 604 may attach a metal sheet 602 to the bracket 500. The metal sheet 602 may include the locking and release mechanisms 210.

Figure 7:
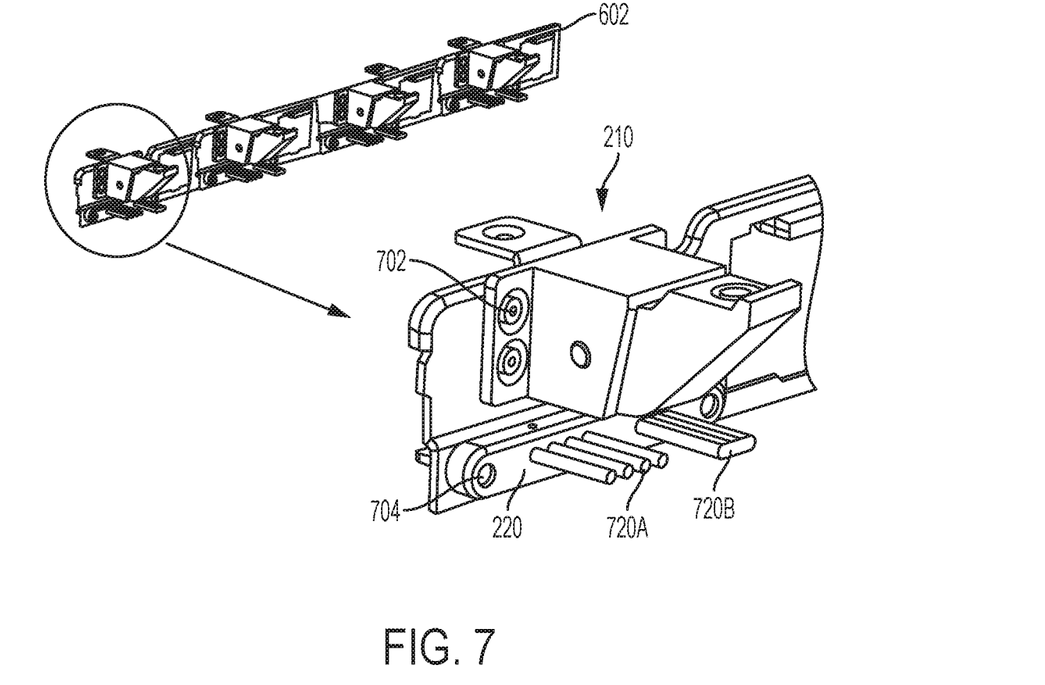
FIG. 7 is a detailed view of an example release mechanism attached to a bracket according to one embodiment of the disclosure.

A more detailed view of the locking and release mechanisms 210 as attached to the metal sheet 602 is shown in FIG. 7. FIG. 7 is a detailed view of an example release mechanism attached to a bracket according to one embodiment of the disclosure. The locking and release mechanism 210 may be attached to the metal sheet 602 by fasteners 702, such as screws or bolts. A cable connector 220 may likewise be attached to the metal sheet 602 by fasteners 704, such as screws or bolts. The cable connector 220 may include male connectors 720A for receiving a data cable and may also include male connectors 720B for receiving a power cable. Although male connectors are shown, the connectors may be either male or female.

Figure 8:
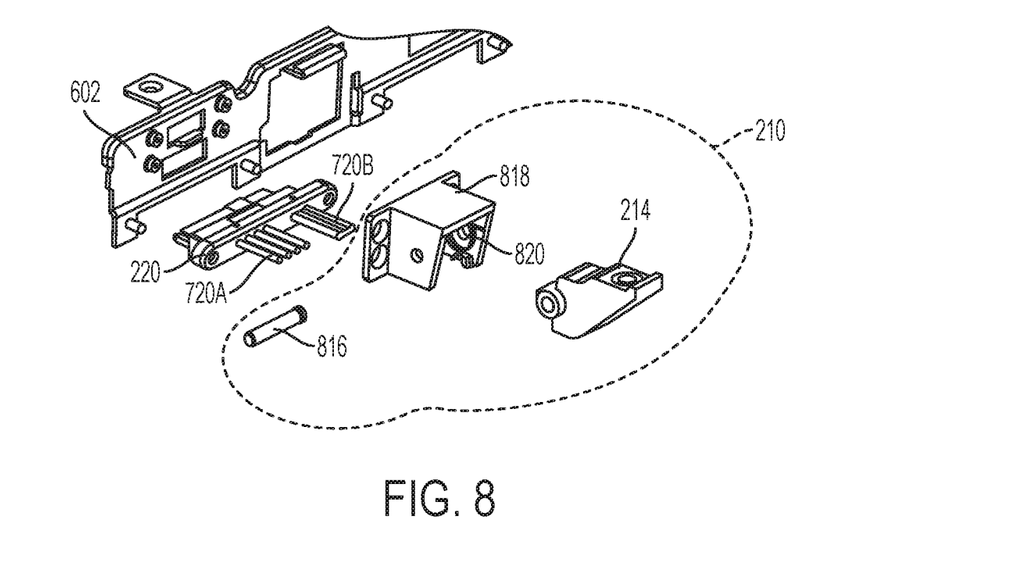
FIG. 8 is an expanded view of an example release mechanism attached to a bracket according to one embodiment of the disclosure.

A more detailed view of the interiors of the locking and release mechanisms 210 is shown in FIG. 8. FIG. 8 is an expanded view of an example release mechanism attached to a bracket according to one embodiment of the disclosure. The locking and release mechanism 210 may include a cam 214 with an opening to receive pin 816. Pin 816 extends through an opening in casing 818, through the cam 214, and again through the casing 818 on an opposite side. A bias mechanism 820, such as a spring may be coupled to the pin 816 and/or the cam 214. The bias mechanism 820 may be configured to return the cam 214 to a resting position after a user has applied force to cam 214 to rotate cam 214 around the pin 816 and release and eject a carrier assembly.

Figure 9:
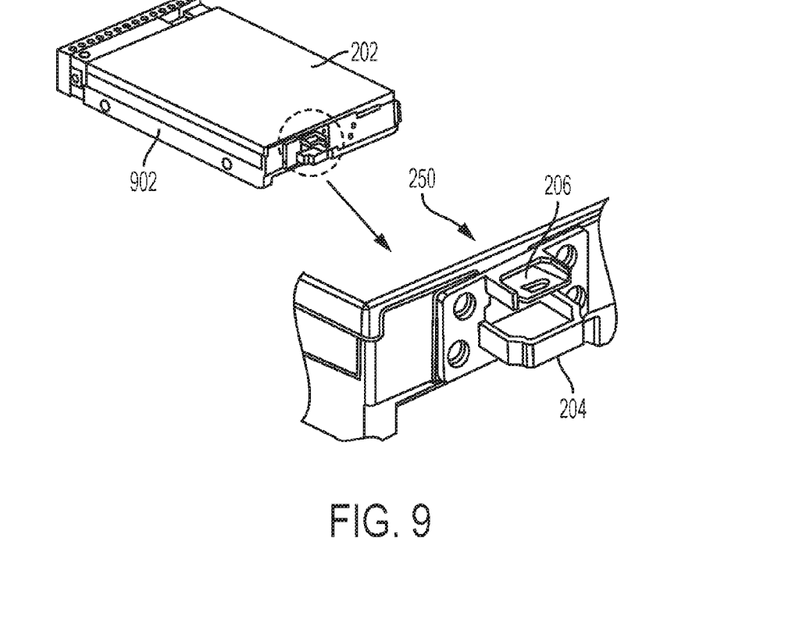
FIG. 9 is a detailed view showing an example carrier for a computer component configured to operate with a release mechanism according to one embodiment of the disclosure.
Figure 10:
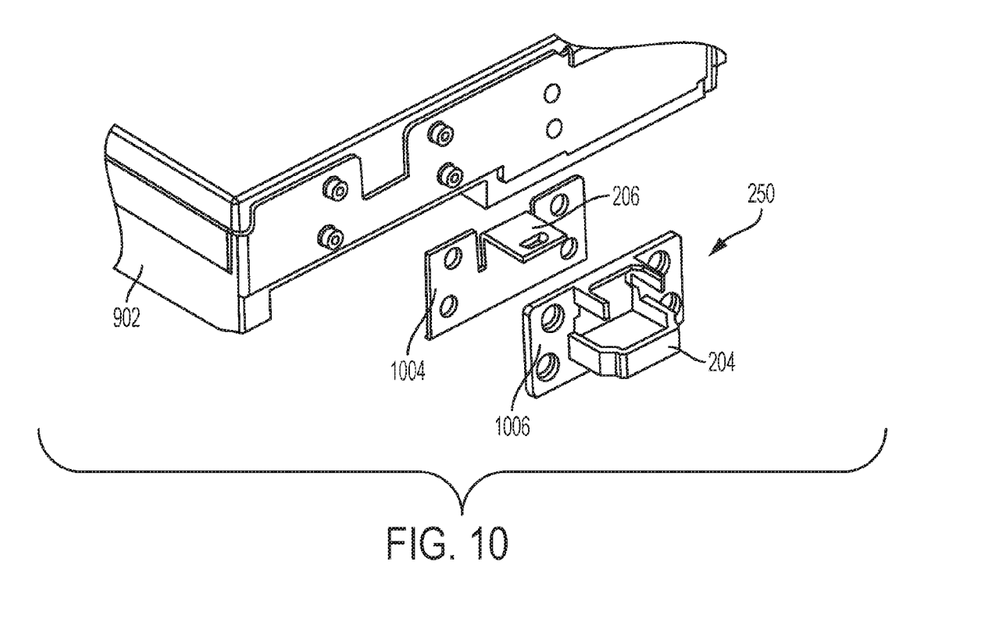
FIG. 10 is an expanded view showing an example carrier for a computer component configured to operate with a release mechanism according to one embodiment of the disclosure.

The locking and release mechanism 210 of the bay 230 may be configured to match a locking mechanism 250 on a carrier assembly 202. A more detailed view of the locking mechanism 250 is shown in FIG. 9. FIG. 9 is a detailed view showing an example carrier for a computer configured to operate with a release mechanism according to one embodiment of the disclosure. The carrier assembly 202 may include a cage 902 that may partially or completely surround a computer component. Additional pieces may attach to the cage 902 to provide locking and release capability when used in cooperation with the locking and release mechanism 210 of the bay 230. Examples of such additional pieces are shown in the expanded view of FIG. 10. FIG. 10 is an expanded view showing an example carrier for a computer component configured to operate with a release mechanism according to one embodiment of the disclosure. As one example, a metal piece 1004 with a carrier latch 206 may attach to the cage 902. As another example, a plastic piece 1006 with the support bracket 204 may attach to the cage 902. Openings in the metal piece 1004 and the plastic piece 1006 may align to allow a single fastener, such as a screw or bolt, to attach both pieces 1004 and 1006 to the cage 902.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Any of these components may be mounted in a carrier and operated with a lever mechanism as described above.

The schematic flow chart diagram of FIG. 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although carriers described above are described as carrying hard disk drives (HDDs), the carriers may also carry other types of drives, such as solid state drives (SSDs), compact disc read-only memory (CD-ROM) drives, digital versatile disc read-only memory (DVD-ROM) drives, and Blu-ray drives. Further, although storage devices may be described, other computer components may be locked and released from a chassis or bay of a chassis, such as power supplies, circuit boards, memory modules, cache modules, graphics cards, expansion boards, wireless modules, switching modules, routing modules, etc. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for releasing a computer component mounted in a carrier from a bay, comprising:
    actuating a carrier latch of the carrier to release the latch from a locked position by a first force applied from a tip of a lever, wherein the applied first force rotates the lever around a pin to translate a force on the lever to actuate the carrier latch to unlock the carrier latch from a stopper flange; and
    at least partially ejecting the computer component by applying a lateral force to the computer component proportional to a subsequent force applied to the lever, wherein an edge of the lever applies a proportional amount of force to a support bracket of the carrier to eject the carrier from the bay.

2. The method of claim 1, wherein the applied first force rotates the lever around a pin to translate a force on the lever to actuate the carrier latch to elevate the carrier latch above a stopper flange.

3. The method of claim 1, wherein the applied subsequent force rotates the lever around a pivot point to translate a subsequent force on the lever to a lateral force applied to the support bracket to push the carrier out of the bay.

4. The method of claim 3, wherein the lateral force applied to the support bracket also disconnects at least one of a data and a power connector from the computer component.

5. A computer component release mechanism, comprising:
    a pivot point;
    a cam comprising a handle at a first location, wherein the cam is configured to rotate around the pivot point such that application of force on the handle results in a proportional force against a carrier latch of a carrier assembly to unlock the carrier and release a computer component attached to the carrier,
    wherein the cam further comprises a tip located at a different rotational point around the pivot point than the handle, and wherein the tip is configured to actuate the carrier latch in response to a force applied to the handle.

6. The apparatus of claim 5, wherein the cam is configured such that an application of force down on the handle results in a proportional upward force against the carrier latch to unlock the carrier.

7. The apparatus of claim 5, further comprising a bias mechanism attached to the cam and configured to maintain the cam in a starting position in the absence of an application of force on the handle.

8. The apparatus of claim 5, wherein the cam further comprises an edge for translating rotational motion of the cam around the pivot point into a lateral motion of the carrier.

9. The apparatus of claim 5, further comprising a cable assembly configured to receive at least one of a data and a power connection and couple the at least one of a data and a power connection to the computer component, wherein the lateral motion of the carrier disconnects the computer component from the at least one of a data and a power connection.

* * * * *